United States Patent [19]

Griffin et al.

[11] Patent Number: 4,980,848
[45] Date of Patent: Dec. 25, 1990

[54] HEAT-EXCHANGE PANEL FOR PORTABLE COMPUTER

[75] Inventors: Wayne L. Griffin, St. Joseph; Eric D. Fuhs, Stevensville; Robert A. Kohtz; Peter A. Ojeda, both of St. Joseph, all of Mich.

[73] Assignee: Zenith Data Systems Corporation, Mt. Prospect, Ill.

[21] Appl. No.: 265,180

[22] Filed: Oct. 31, 1988

[51] Int. Cl.$^5$ .............................................. G06F 1/00
[52] U.S. Cl. .................................................... 364/708
[58] Field of Search ................ 364/708; 361/380, 381, 361/417

[56] References Cited

U.S. PATENT DOCUMENTS

| | | | |
|---|---|---|---|
| 4,496,943 | 1/1985 | Greenblatt | 364/708 |
| 4,571,456 | 2/1986 | Paulsen et al. | 340/700 X |
| 4,617,640 | 10/1986 | Kishi et al. | 364/708 |
| 4,742,478 | 5/1988 | Nigro, Jr. et al. | 364/708 |
| 4,839,837 | 6/1989 | Chang | 364/708 |

FOREIGN PATENT DOCUMENTS 60-183621  9/1985  Japan .................... 364/708

Primary Examiner—Gary V. Harkcom
Assistant Examiner—Long T. Nguyen

[57] ABSTRACT

A portable computer with a base and keyboard with a pivotal lid assembly containing both a visual display panel and a parallel mounted central processing unit circuit board, as well as coplanar memory and visual display driving circuitry. The lid assembly is provided with front and rear clam shell covers with the front cover holding a bezel around the visual display (an LCD), and the front also provides the supports for the circuit boards in spaced, parallel relation to both the LCD and the rear cover, so when the lid is open and generally vertical, air blows by convection through lower vent holes in the covers, over both sides of the boards, and exits through upper vent holes.

12 Claims, 5 Drawing Sheets

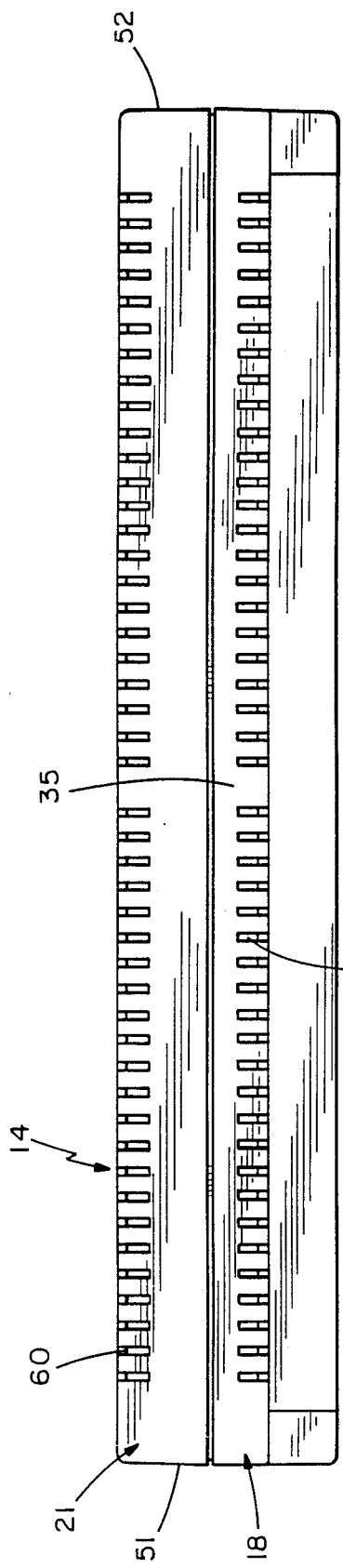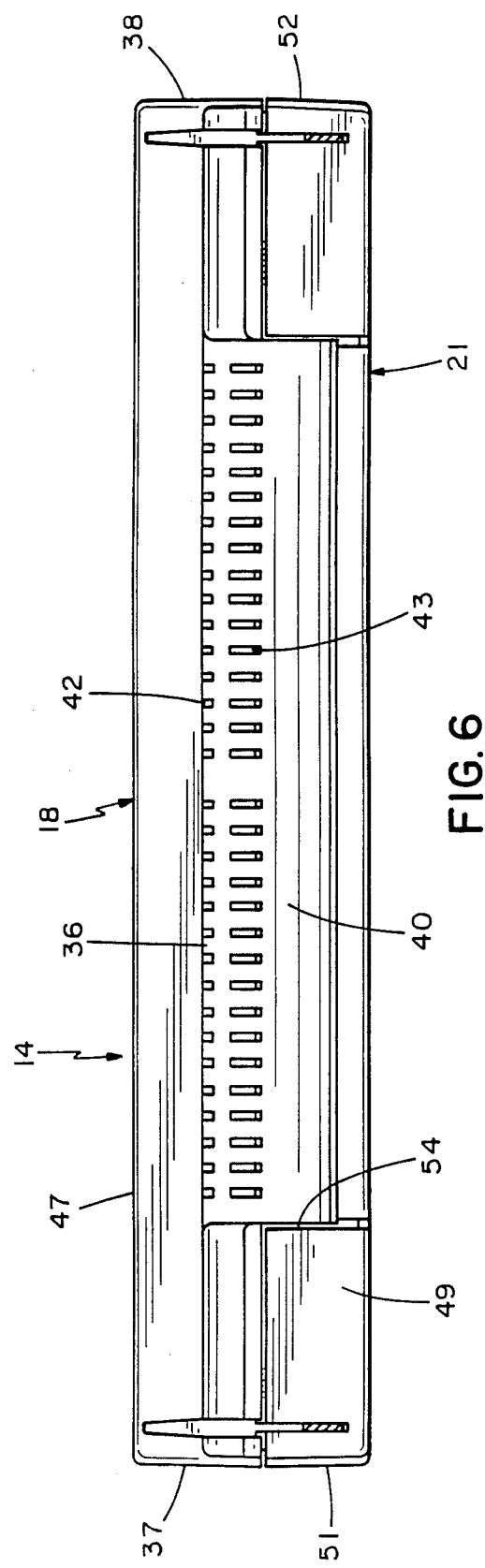

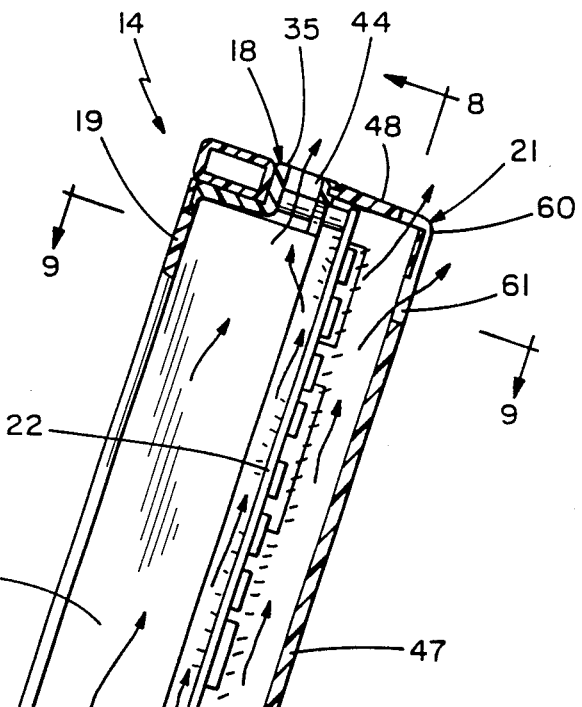
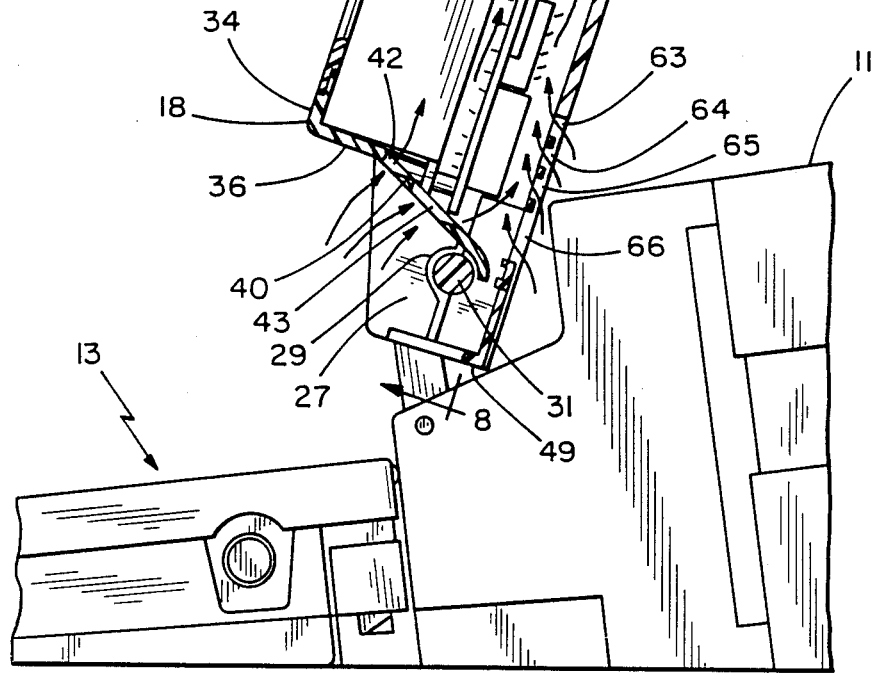
FIG. 7

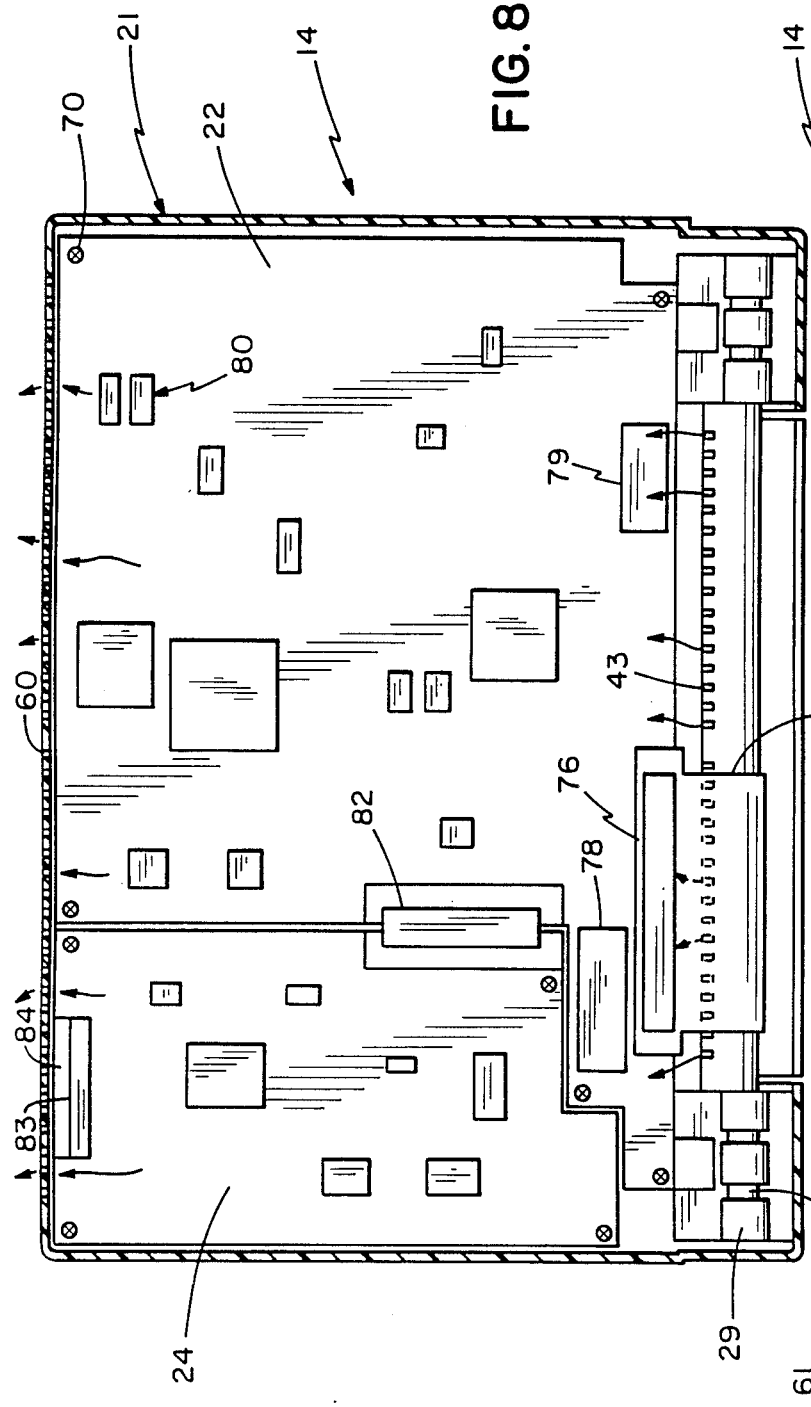
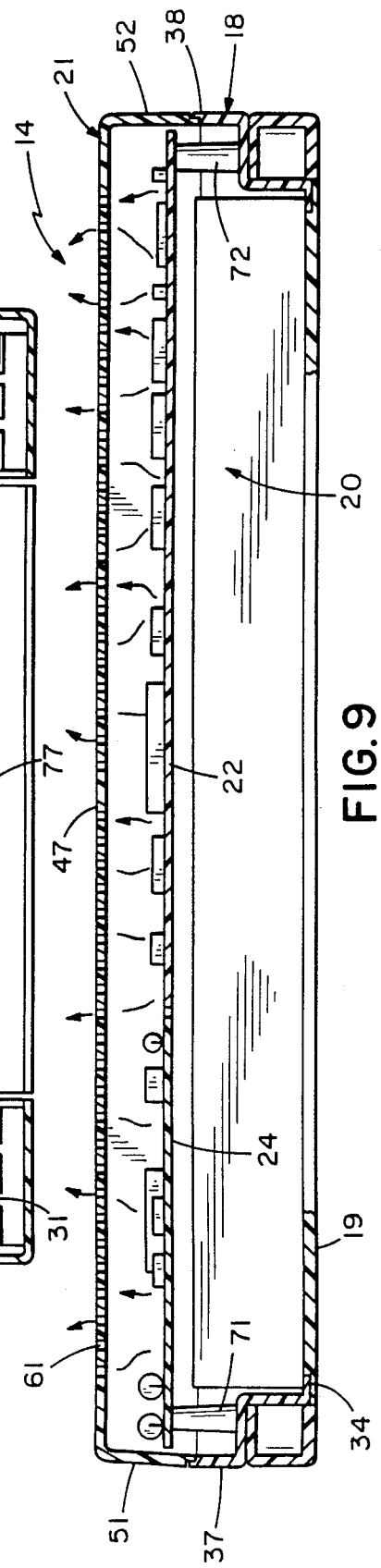

HEAT-EXCHANGE PANEL FOR PORTABLE COMPUTER

BACKGROUND OF THE INVENTION

Over recent years there has been widespread development of personal computers, and the industry has experienced a rather dramatic increase in the design, development and sale of computers which are portable. These portable computers are not significantly larger than small portable typewriters, and contain their own built-in central processing unit, memory, hard drive, disk drives, keyboard, display and carrying handle. The keyboard usually projects forwardly from a base and the display is typically a liquid crystal display contained on one side of a panel or lid which folds down flat on the upper surface of the keyboard to serve as a cover to protect the keyboard and display during storage and travel.

It is desirable that the display panel, including the hinging hardware, fold flush with the upper surface of the keyboard, and this is usually accomplished by accommodating the display panel with a recess into which the upper surface of the keyboard fits.

Because the base, in the past, houses the disk drives, hard drive, power supply, battery pack, optional component boards, and circuit boards for the CPU (central processing unit), memory and display driver, the optimum space allocation within the base was a problem and dictated that the various circuit boards be stacked usually parallel to one another within the base either horizontally or vertically. This layering of circuit boards within the base requires the removal of the boards individually for inspection and testing, and more importantly provides an obstruction to ventilation air flowing through the base.

It is a primary object of the present invention to provide a portable computer that ameliorates the problems noted above in housing circuit boards in the computer base.

SUMMARY OF THE PRESENT INVENTION

In accordance with the present invention, a portable computer with a base and keyboard is provided with a pivotal lid assembly containing both a visual display panel and a parallel mounted central processing unit circuit board, as well as coplanar memory and visual display driving circuitry.

Since the CPU, i.e. central processing unit, is almost always circuit board mounted, as are the computer memory, and visual display drive, the lid assembly being similarly planar and large in two dimensional area, provides an extremely convenient location for these components. The location of the CPU board, sometimes referred to as a "mother board", in the lid assembly behind the visual display, as well as the other circuitry noted, besides physical convenience, provides more efficient board cooling, enables direct, simple access to all circuitry by removing a rear lid cover without removing any circuit boards, and importantly frees the base for space needed for the drives and additional option boards.

Toward these ends, the present lid assembly is provided with front and rear clam shell covers with the front cover holding a bezel around the visual display (an LCD in this instance), and the front also provides the supports for the circuit boards in spaced, single planar relation to both the LCD and the rear cover, so that when the lid is open and generally vertical, air flows by convection through lower vent holes in the covers, over both sides of the boards, and exits through upper vent holes providing a superior heat-exchange temperature control for the circuitry on the boards.

Other objects and advantages of the present invention will appear more clearly from the following detailed description.

BRIEF DESCRIPTION OF THE DRAWINGS

FIG. 5 is a further enlarged top view of the lid assembly illustrated in FIGS. 3 and 4;

FIG. 6 is an enlarged fragmentary bottom view of the lid assembly illustrated in FIG. 5;

FIG. 7 is a fragmentary right side view of the present portable computer with the lid assembly sectioned, taken generally along line 7—7 of FIG. 4;

FIG. 8 is a cross-section of the lid assembly taken generally along line 8—8 of FIG. 7, and;

FIG. 9 is a cross-section of the lid assembly taken generally along line 9—9 of FIG. 7.

DETAILED DESCRIPTION OF THE PREFERRED EMBODIMENT

Figure 1:
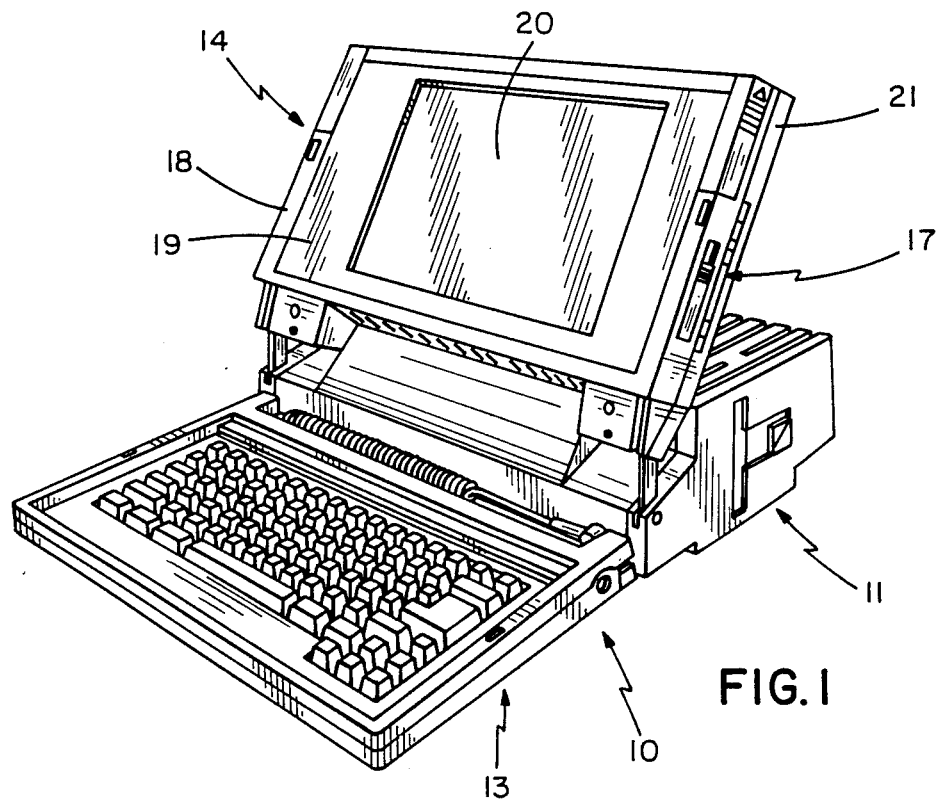
FIG. 1 is a perspective view of the present portable computer with its lid assembly open.
Figure 2:
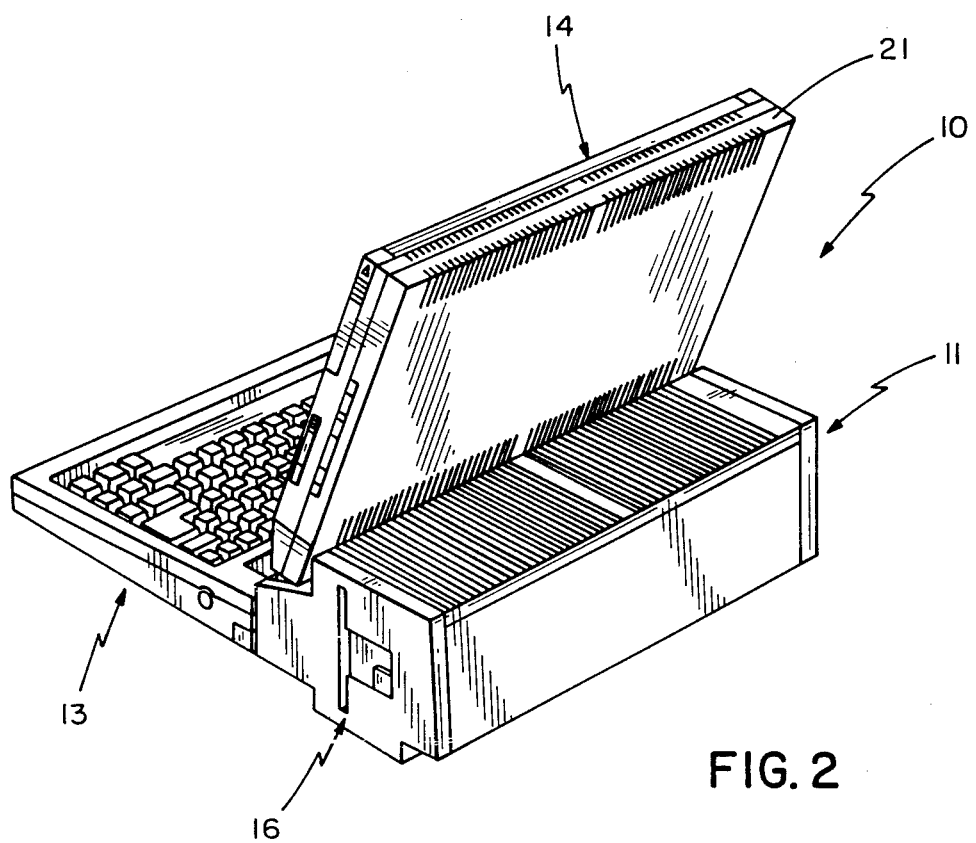
FIG. 2 is a rear perspective view of the present portable computer illustrated in FIG. 1.

Referring to the drawings, and particularly FIGS. 1 and 2, a portable computer 10 is illustrated according to the present invention and is seen to generally include a transversely elongated base 11, a keyboard assembly 13, and a lid assembly 14 pivotally mounted on base 11. The lid assembly 14 is selectively locked over the keyboard assembly 13 by side latch assemblies 17 mounted on the opposite sides of lid assembly 14.

The base 11 houses a disk drive 16, a hard drive, power supply, battery pack, and optional board slots for other features such as modems and memory expansion.

The lid assembly 14, according to the present invention, generally includes a front cover 18 having a bezel 19 together supporting an LCD display 20, a rear cover 21 arranged in clam-shell fashion with cover 18, a CPU board 22, and an LCD drive board 24 (see FIGS. 7 and 9).

As seen in FIGS. 3, 5, 6, 7 and 9, the forward cover 18 has a pair of downwardly projecting spaced flanges 26 and 27 that each have a bearing assembly 29 (FIG. 7) pivotally mounted on pivot rod 31 carried by base 11, and in this way the lid assembly 14 is pivotally mounted on base 11.

Front cover 18 has a forward wall 34 that holds bezel 19 in position, top and bottom walls 35 and 36 and side walls 37 and 38.

Figure 3:
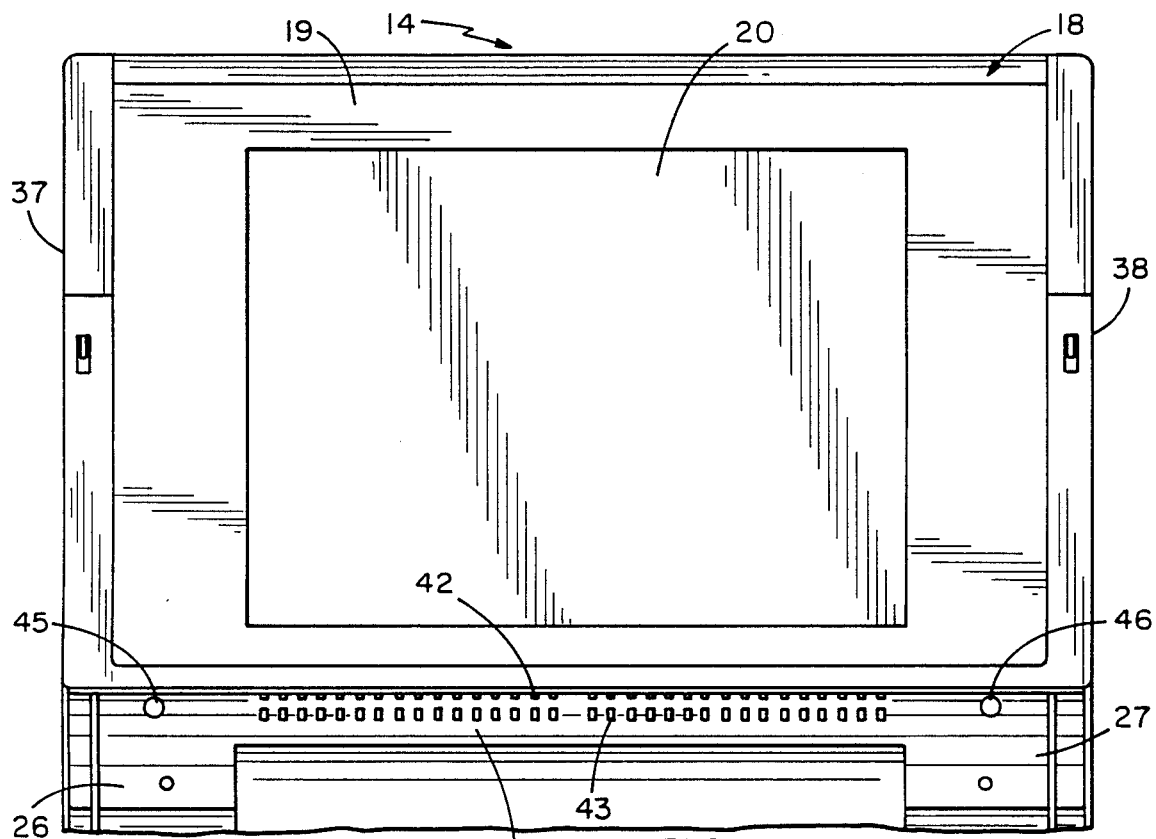
FIG. 3 is an enlarged fragmentary front view of the lid assembly illustrated in FIGS. 1 and 2.

As seen in FIGS. 3, 6 and 7, bottom wall 36 has a downwardly angled central portion 40 with two spaced rows of rectangular vent apertures 42 and 43 therein. There is also a row of apertures 44 in front cover top wall 35, as seen clearly in FIGS. 5 and 7.

Rear cover 21 is fastened to front cover 18 by four fasteners (not shown), the lower two at locations 45 and 46 illustrated in FIG. 3, and the other two are at the top of the covers, and rear cover 21 is seen to include a flat rear wall 47, top and bottom walls 48 and 49, and side walls 51 and 52.

As seen in FIG. 6, bottom wall 49 of the rear cover 21 is cut out at 54 to receive the downwardly angled portion 40 of the front cover bottom wall 36.

Figure 4:
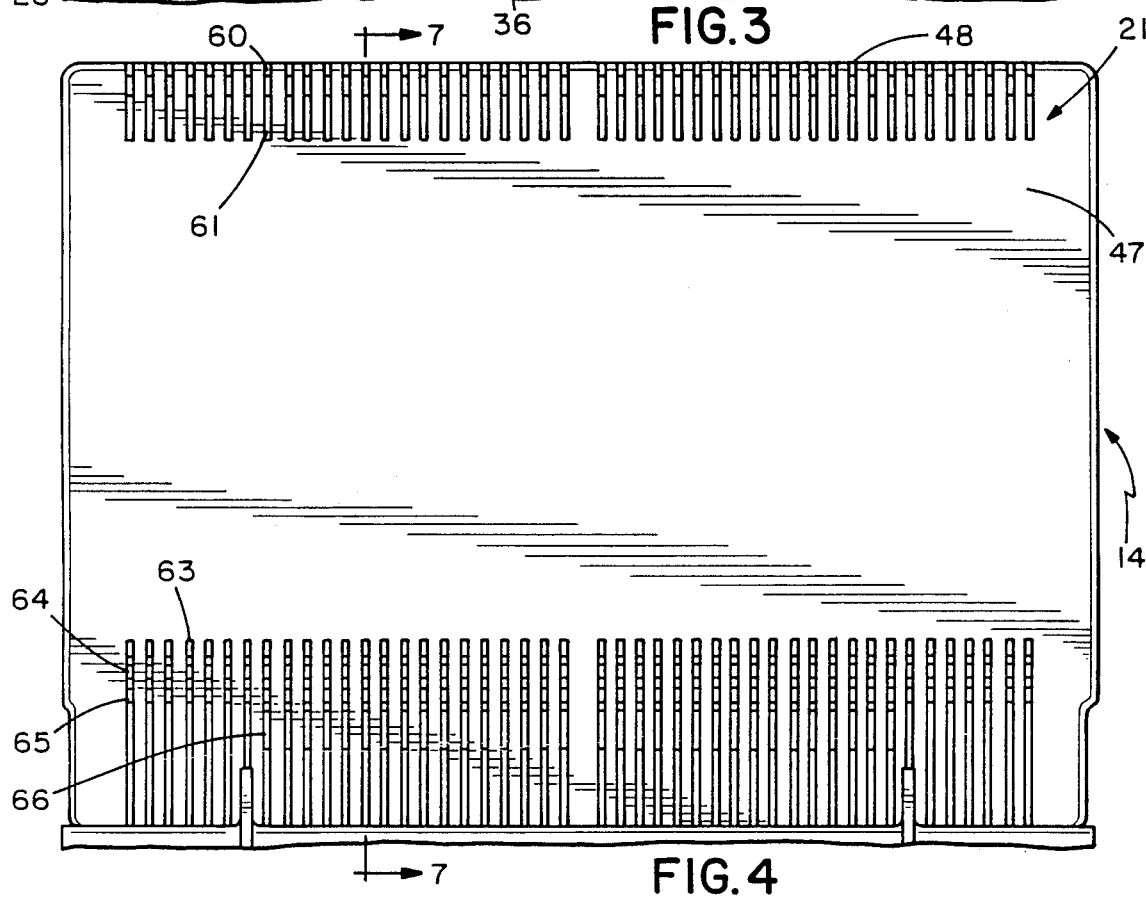
FIG. 4 is a fragmentary rear view of the lid assembly illustrated in FIG. 3.

Viewing FIGS. 5 and 7, the rear cover 21 has a first row of rectangular apertures 60 at the juncture of top wall 48 and rear wall 47, a second row of rectangular apertures 61 near the top of rear wall 47, and third, fourth, fifth and sixth rows of rectangular apertures 63, 64, 65 and 66 (also see FIG. 4), near the bottom of rear wall 47.

Viewing FIG. 8, the two circuit boards mounted in lid assembly 14, namely, CPU board 22 and video display driver board 24, are both mounted to the front cover 18 by a plurality of fasteners 70 extending through the boards into integral threaded fastener posts such as indicated at 71 and 72 in FIG. 9 that extend upwardly from front cover forward wall 34. Posts 71 and 72 have a sufficient length so that the circuit boards 22 and 24 and their components are spaced a substantial distance from both the LCD display 20 and the rear wall 47 of rear cover 21.

It should be understood that the CPU board 22 and driver board 24 are shown somewhat diagramatically in the drawings, and particularly in FIG. 8, and in actuality, additional chips and circuitry would virtually fill the boards but have been eliminated solely for drawing simplicity.

As seen in FIG. 8, board 22 would typically carry a terminal connector 76 accessing the keyboard 13 and the components in base 11 through a ribbon cable, 77, an on-board battery 78, a plurality of microprocessor chips such as indicated at 79, and banks of memory chips 80 illustrated in abbreviated form. Similarly, the LCD driver board 24 would include memory decoding and driving image producing circuitry inputted from the CPU board 22 through releasable connector 82 and outputted to the LCD display 20 through a connector 83 and a ribbon cable 84.

As seen in FIG. 7, air flows upwardly through the lid assembly 14, as indicated by the arrows through apertures 42, 43, 63, 64, 65 and 66, across both the front and rear sides of the boards 22 and 24 and exits at the upper end of the covers through apertures 44, 60 and 61, thereby providing efficient heat-exchange cooling of the circuit boards by convection since, of course, the lid assembly 14 when open and in operation is in a generally vertical position taking advantage of the natural upward heated air flow.

What is claimed is:

1. A portable computer with a central processing unit and memory, comprising: a base constructed to support the computer including at least one disk drive, a keyboard assembly attached to and projecting forwardly from the base, a relatively thin lid assembly separate from the base pivotally mounted on the computer movable from a closed position over the keyboard assembly to an open position permitting viewing of a visual display, and a circuit board mounted in the lid assembly behind the display containing major heat producing electrical components including at least the central processing unit, said lid assembly being planar in configuration with a thickness substantially less than its planar dimensions, said display also being planar with a thickness substantially less than its planar dimensions and being mounted in the lid assembly, said circuit board being mounted in the lid assembly immediately behind and parallel to the planar display.

2. A portable computer, as defined in claim 1, wherein the lid assembly includes both the computer memory and central processing unit.

3. A portable computer, as defined in claim 1, wherein an additional circuit board is provided in the lid assembly behind the display and contains drive circuitry for the display.

4. A portable computer, as defined in claim 1, wherein the circuit board has memory accessed by the control memory unit and an on board battery for the central processing unit.

5. A portable computer, as defined in claim 1, wherein the circuit board is planar and extends across substantially the entire area of the video display.

6. A portable computer with a central processing unit and memory, comprising: a base constructed to support the computer including at least one disk drive, a keyboard assembly attached to and projecting forwardly from the base, a lid assembly pivotally mounted on the computer movable from a closed position over the keyboard assembly to an open position permitting viewing of a visual display, a circuit board mounted in the lid assembly behind the display containing major heat producing electrical components including at least the central processing unit, the lid assembly including a generally rectangular forward cover that in part defines a bezel for the display, a generally rectangular rear cover releasably attached to the forward cover, and a plurality of vents in a lower portion and an upper portion of at least one of the covers so that with the lid assembly open in a generally vertical position air may flow upwardly through the lid assembly cooling the circuit board.

7. A portable computer with a central processing unit and memory, comprising: a base constructed to support the computer including at least one disk drive, a keyboard assembly attached to and projecting forwardly from the base, a lid assembly pivotally mounted on the computer movable from a closed position over the keyboard assembly to an open position permitting viewing of a visual display, said lid assembly including a generally rectangular forward cover that in part defines a bezel for the display, a generally rectangular rear cover releasably attached to the forward cover, a plurality of vents in a lower portion and an upper portion of at least one of the covers, and a circuit board mounted in the lid assembly on the forward cover, parallel to and spaced from the display, said circuit board containing major heat producing electrical components including at least the central processing unit and memory for the computer, said rear cover covering the circuit board but spaced therefrom, whereby when the lid assembly is in a generally vertical open position cooling air may flow upwardly through the lid assembly on both sides of the circuit board.

8. A portable computer, as defined in claim 7, wherein the circuit board is planar and extends across substantially the entire area of the display.

9. A portable computer, as defined in claim 7, wherein the circuit board in the lid assembly includes both the computer memory and central processing unit, and an additional circuit board in the lid assembly behind the display containing drive circuitry for the video display.

10. A portable computer, as defined in claim 7, wherein the forward and rear covers have bottom walls and top walls, said vents including a plurality of apertures in at least one of the bottom walls and at least one of the top walls.

11. A portable computer, as defined in claim 10, wherein the rear cover has a rear wall having a plurality of vent apertures in its lower portion and a plurality of vent apertures in an upper portion thereof.

12. A portable computer with a central processing unit and memory, comprising: a base constructed to support the computer including at least one disk drive, a keyboard assembly attached to and projecting forwardly from the base, a lid assembly pivotally mounted on the computer movable from a closed position over the keyboard assembly to an open position permitting viewing of a visual display, said lid assembly including a generally rectangular forward cover that in part defines a bezel for the display, a generally rectangular rear cover releasably attached to the forward cover, a plurality of vents in a lower portion and an upper portion of at least one of the covers, a circuit board mounted in the lid assembly on the forward cover, parallel to and spaced from the display, said circuit board containing major heat producing electrical components including both the central processing unit and memory for the computer, said rear cover covering the circuit board but spaced therefrom, whereby when the lid assembly is in a generally vertical open position cooling air may flow upwardly through the lid assembly on both sides of the circuit board, the forward and rear covers having bottom walls and top walls, said vents including a plurality of apertures in the bottom walls and the top walls, the rear cover having a rear wall having a plurality of vent apertures in a lower portion and plurality of vent apertures in the upper portion.

* * * * *